US012601899B2

(12) United States Patent
Liu et al.

(10) Patent No.: US 12,601,899 B2
(45) Date of Patent: Apr. 14, 2026

(54) DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Yanhua Liu, Wuhan (CN); Mingyan Huang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 384 days.

(21) Appl. No.: 18/135,462

(22) Filed: Apr. 17, 2023

(65) Prior Publication Data

US 2023/0251468 A1     Aug. 10, 2023

(30) Foreign Application Priority Data

Oct. 31, 2022     (CN) .......................... 202211352304.5

(51) Int. Cl.
*G02B 13/00* (2006.01)
*H04N 23/53* (2023.01)
*H04N 23/55* (2023.01)

(52) U.S. Cl.
CPC ......... *G02B 13/0065* (2013.01); *H04N 23/53* (2023.01); *H04N 23/55* (2023.01)

(58) Field of Classification Search
CPC .... G02B 13/0065; H04N 23/53; H04N 23/55; B60R 25/252; G06K 9/00053; G05B
2219/24162; G06V 40/13; G06V 10/13; G06V 10/147; G06V 10/1329; G06V 10/1324; G06V 10/1318
USPC ............................................................. 359/1
See application file for complete search history.

(56) References Cited

U.S. PATENT DOCUMENTS

| | | | | |
|---|---|---|---|---|
| 5,650,842 A | * | 7/1997 | Maase ................ | G06V 40/1324 382/125 |
| 6,891,962 B1 | * | 5/2005 | Kuno ................. | G06V 40/1324 359/837 |

FOREIGN PATENT DOCUMENTS

| | | |
|---|---|---|
| CN | 109597267 B | 6/2020 |
| CN | 210807361 U | 6/2020 |

* cited by examiner

*Primary Examiner* — Travis S Fissel
(74) *Attorney, Agent, or Firm* — KDW FIRM PLLC

(57) ABSTRACT

Provided is a display device. The display device includes a primary display screen, a secondary display screen, an image acquisition unit, a primary display region, and a secondary display region. The primary display region is connected to the secondary display region. The primary display screen is disposed in the primary display region. The secondary display screen is disposed in the secondary display region. In a first display state, a gap exists between the primary display screen and the secondary display screen in a first direction. The length of a section line segment of a light receiving surface of the image acquisition unit on a first plane is L2. The length L1 of the gap between the primary display screen and the secondary display screen in the first direction satisfies that L1<L2.

20 Claims, 9 Drawing Sheets

DISPLAY DEVICE

CROSS-REFERENCE TO RELATED APPLICATION(S)

This application claims priority to Chinese Patent Application No. 202211352304.5 filed Oct. 31, 2022, the disclosure of which is incorporated herein by reference in its entirety.

TECHNICAL FIELD

Embodiments of the present disclosure relate to the field of display technology and, in particular, to a display device.

BACKGROUND

In a conventional electronic product, the top of a display screen module is a non-display region. A light extraction module such as a front-facing camera is disposed at the bottom of the non-display region. External light is collected through an opening in the non-display region. Such an arrangement results in a relatively large black frame in the screen, and that a region corresponding to the camera cannot be used for display, making the full-screen display difficult to be implemented.

However, for the existing design, a secondary display screen is disposed in the non-display region on the top, and a transflective mirror is disposed in a gap between the secondary display screen and a primary display screen in a first direction. The first direction is a light emission direction of the secondary display screen. Moreover, the camera is disposed on a reflection direction of the transflective mirror. However, the height difference between the two display screens in the first direction may exist, causing the display unevenness.

SUMMARY

The present disclosure provides a display device to reduce the height difference between two display screens in a first direction, thereby reducing the distance difference between the two display screens in visual perception and mitigating the display unevenness between the two display screens.

Embodiments of the present disclosure provide a display device. The display device includes a primary display screen, a secondary display screen, an image acquisition unit, a primary display region, and a secondary display region. The primary display region is connected to the secondary display region.

The primary display screen is disposed in the primary display region. The secondary display screen is disposed in the secondary display region. In a first display state, a gap exists between the primary display screen and the secondary display screen in a first direction. The first direction is a light emission direction of the secondary display screen.

A length of a section line segment of a light receiving surface of the image acquisition unit on a first plane is L2. The first plane is perpendicular to the secondary display screen.

A length L1 of the gap between the primary display screen and the secondary display screen in the first direction satisfies that L1<L2.

Embodiments of the present disclosure provide a display device. The display device includes a primary display screen, a secondary display screen, an image acquisition unit, a primary display region, and a secondary display region. The primary display region is connected to the secondary display region. The primary display screen is disposed in the primary display region. The secondary display screen is disposed in the secondary display region. In a first display state, a gap exists between the primary display screen and the secondary display screen in a first direction. A length of a section line segment of a light receiving surface of the image acquisition unit on a first plane is L2. A length L1 of the gap between the primary display screen and the secondary display screen in the first direction satisfies that L1<L2. Compared with an existing display device, embodiments of the present disclosure can reduce the height difference between the primary display screen and the secondary display screen in the first direction, thereby reducing the distance difference between the two display screens in visual perception, mitigating the display unevenness between the two display screens, and implementing the full-screen display with an under-screen camera.

BRIEF DESCRIPTION OF DRAWINGS

To illustrate technical schemes in embodiments of the present disclosure more clearly, drawings used in the description of the embodiments are briefly described hereinafter. Apparently, the drawings described below illustrate part of embodiments of the present disclosure, and those of ordinary skill in the art may obtain other drawings based on the drawings described below on the premise that no creative work is done.

DETAILED DESCRIPTION

Figure 1:
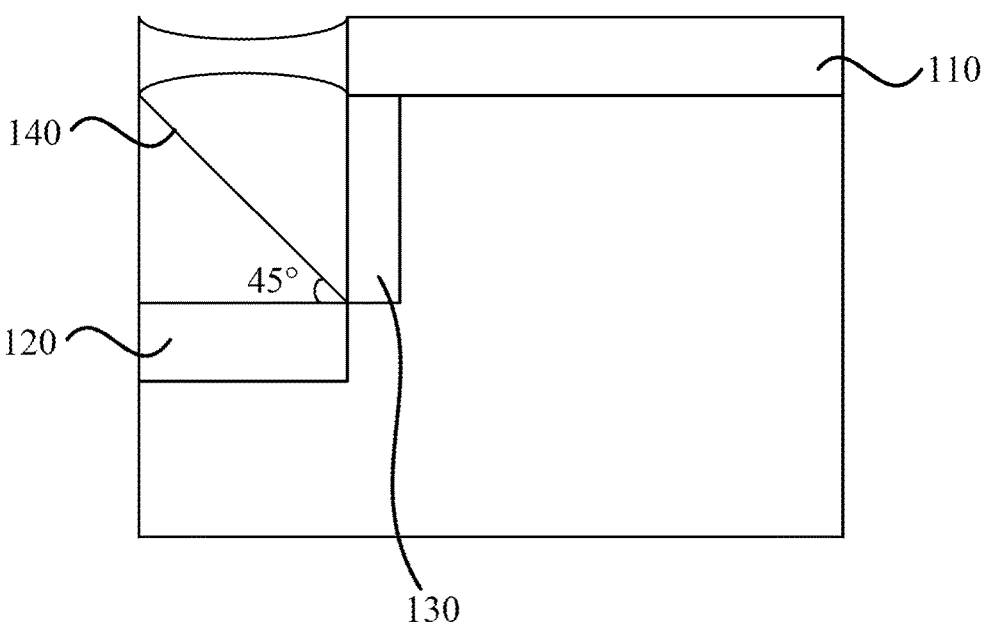
FIG. 1 is a structural diagram of an existing display device.

Hereinafter the present disclosure is further described in detail in conjunction with the drawings and embodiments. It is to be understood that the embodiments described herein are intended to illustrate and not to limit the present disclosure. Additionally, it is to be noted that for ease of description, only part, not all, of structures related to the present disclosure are illustrated in the drawings.

Terms used in embodiments of the present disclosure are intended only to describe the embodiments and not to limit the present disclosure. It is to be noted that spatially related terms, including "on", "below", "left" and "right" used in embodiments of the present disclosure, are described from the perspective of the drawings, and are not to be construed as a limitation to the present disclosure. In addition, in the context, it is to be understood that when a component is formed "on" or "below" another component, the component may not only be directly formed "on" or "below" another component, and may also be indirectly formed "on" or "below" another component via an intermediate component. Terms such as "first" and "second" are used only for the purpose of description to distinguish between different components and not to indicate any order, quantity, or importance. For those of ordinary skill in the art, specific meanings of the preceding terms in the present disclosure may be understood based on specific situations.

The terms "comprise", "include" and variations thereof in the present disclosure are intended to be inclusive, that is, "including, but not limited to". The term "based on" is "at least partially based on". The term "an embodiment" refers to "at least one embodiment".

It is to be noted that references to "first", "second", and the like in the present disclosure are merely intended to distinguish corresponding content and are not intended to limit an order or an interrelationship.

It is to be noted that "one" and "a plurality" mentioned in the present disclosure are illustrative and not limiting, and that those skilled in the art should understand that "one" and "a plurality" should be understood as "one or more" unless clearly expressed in the context.

FIG. 1 is a structural diagram of an existing display device. As shown in FIG. 1, the display device includes a primary display screen 110, a secondary display screen 120, an image acquisition unit 130, and a transflective mirror 140. A gap exists between the primary display screen 110 and the secondary display screen 120 in a first direction. The first direction is a light emission direction of the secondary display screen 120. The transflective mirror 140 is located on a light emission side of the secondary display screen 120. An included angle between the transflective mirror 140 and the secondary display screen 120 is 45°. The image acquisition unit 130 is located on a side of the secondary display screen 120 facing the primary display screen 110. Moreover, the length of a section line segment of a light receiving surface of the image acquisition unit 130 on a first plane is equal to the length of the gap existing between the primary display screen 110 and the secondary display screen 120 in the first direction. The first plane is perpendicular to the secondary display screen 120. However, the included angle between the transflective mirror 140 and the secondary display screen 120 may limit the size of the gap between the primary display screen 110 and the secondary display screen

120 in the first direction. The size of the light receiving surface of the image acquisition unit 130 may also limit the size of the gap between the primary display screen 110 and the secondary display screen 120 in the first direction. In this case, a relatively long distance exists between the primary display screen 110 and the secondary display screen 120 in the first direction, resulting in that the primary display screen 110 and the secondary display screen 120 are displayed unevenly in visual perception.

Figure 2:
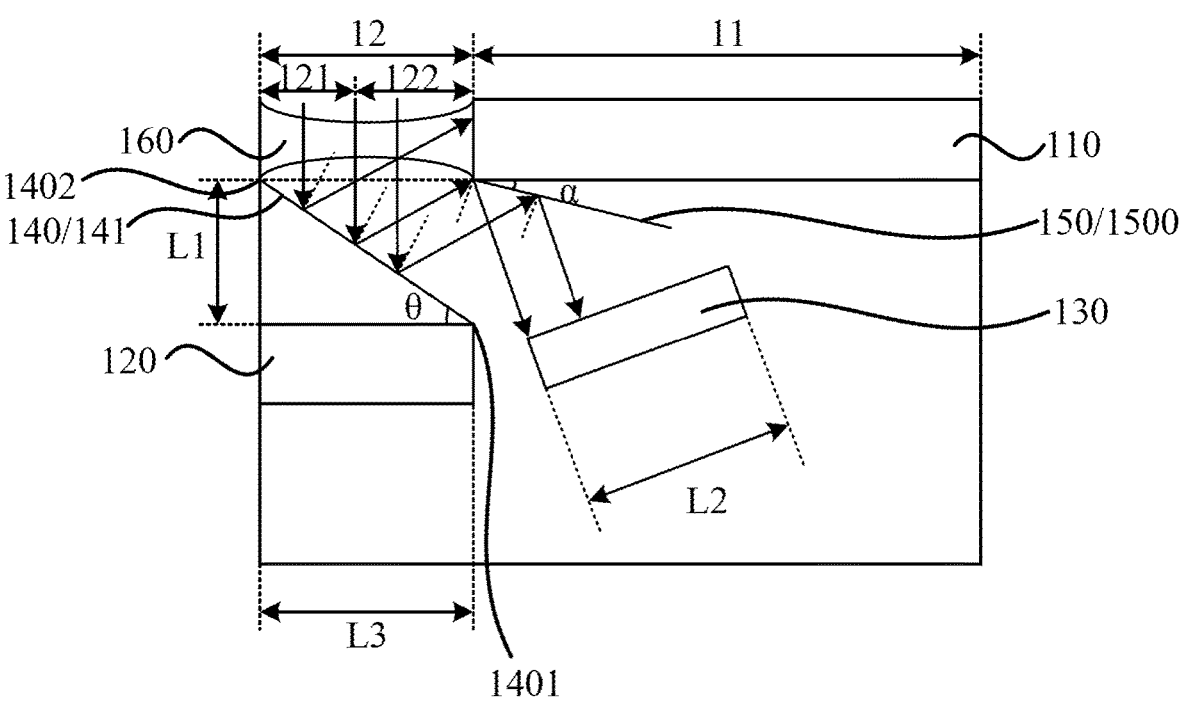
FIG. 2 is a structural diagram of a display device according to an embodiment of the present disclosure.

Regarding the preceding technical issue, embodiments of the present disclosure provide a display device. FIG. 2 is a structural diagram of a display device according to an embodiment of the present disclosure. As shown in FIG. 2, the display device includes a primary display screen 110, a secondary display screen 120, an image acquisition unit 130, a primary display region 11, and a secondary display region 12. The primary display region 11 is connected to the secondary display region 12. The primary display screen 110 is disposed in the primary display region 11. The secondary display screen 120 is disposed in the secondary display region 12. In a first display state, a gap exists between the primary display screen 110 and the secondary display screen 120 in a first direction. The first direction is a light emission direction of the secondary display screen 120. The length of a section line segment of a light receiving surface of the image acquisition unit 130 on a first plane is L2. The first plane is perpendicular to the secondary display screen 120. The length L1 of the gap between the primary display screen 110 and the secondary display screen 120 in the first direction satisfies that L1<L2.

Specifically, the display device includes the primary display region 11 and the secondary display region 12 that are connected to each other. The primary display screen 110 is disposed in the primary display region 11. The secondary display screen 120 is disposed in the secondary display region 12. In the first display state, the gap exists between the primary display screen 110 and the secondary display screen 120 in the first direction. The first display state includes, for example, a shooting state or a lighting state. When the display device needs to use the image acquisition unit 130 to perform shooting or lighting, a certain gap needs to exist between the primary display screen 110 and the secondary display screen 120 in the first direction so as to introduce external light. The image acquisition unit 130 may be, for example, a camera or a sensor. The maximum value of the light width that can be received by the image acquisition unit 130 is L2. The image acquisition unit 130 is disposed in a propagation direction of an optical path of the display device so as to reduce the limitation, imposed by the size of the image acquisition unit 130, on the gap between the primary display screen 110 and the secondary display screen 120 in the first direction, mitigating the display unevenness between the primary display screen 110 and the secondary display screen 120 in visual perception.

It is to be noted that the embodiments of the present disclosure do not limit relative positions of the primary display screen 110 and the secondary display screen 120 that are not in the first display state. Relative positions of the primary display screen 110 and the secondary display screen 120 that are in a non-shooting state or a non-lighting state may be consistent with relative positions of the primary display screen 110 and the secondary display screen 120 that are in the shooting state or the lighting state. Alternatively, the primary display screen 110 and the secondary display screen 120 may be controlled to move in the non-shooting state or the non-lighting state to narrow the gap between the primary display screen 110 and the secondary display screen 120 in the first direction. Exemplarily, when the display device is not in the first display state, the primary display screen 110 and the secondary display screen 120 may be moved to be located in the same plane.

Embodiments of the present disclosure provide a display device. The display device includes a primary display screen, a secondary display screen, an image acquisition unit, a primary display region, and a secondary display region. The primary display region is connected to the secondary display region. The primary display screen is disposed in the primary display region. The secondary display screen is disposed in the secondary display region. In a first display state, a gap exists between the primary display screen and the secondary display screen in a first direction. The length of a section line segment of a light receiving surface of the image acquisition unit on a first plane is L2. The length L1 of the gap between the primary display screen and the secondary display screen in the first direction satisfies that L1<L2. Compared with an existing display device, embodiments of the present disclosure can reduce the height difference between the primary display screen and the secondary display screen in the first direction, thereby reducing the distance difference between the two display screens in visual perception, mitigating the display unevenness between the two display screens, and implementing the full-screen display with an under-screen camera. Moreover, the position of the image acquisition unit can be changed, reducing the limitation, imposed by the image acquisition unit, on the gap between the primary display screen and the secondary display screen in the first direction.

Optionally, the display device further includes a transflective mirror 140 located in the secondary display region 12 and on a light emission side of the secondary display screen 120. The transflective mirror 140 includes a first reflective surface 141 facing away from the secondary display screen 120. The orientation of the first reflective surface 141 is inclined from the first direction toward the primary display screen 110 so that external reflected light is at least reflected toward the gap between the primary display screen 110 and the secondary display screen 120. The external reflected light is the reflected light of external incident light on the first reflective surface 141.

Specifically, with continued reference to FIG. 2, the transflective mirror 140 is located on the light emission side of the secondary display screen 120 so that the length L1 of the gap between the primary display screen 110 and the secondary display screen 120 in the first direction is changed by changing the angle of inclination of the transflective mirror 140. Exemplarily, the angle at which the first reflective surface 141 of the transflective mirror 140 is inclined from the first direction toward the primary display screen 110 is reduced so as to reduce the length of the transflective mirror 140 in the first direction and reduce the length L1 of the gap between the primary display screen 110 and the secondary display screen 120 in the first direction, thereby reducing the distance difference between the primary display screen 110 and the secondary display screen 120 in visual perception, mitigating the display unevenness between the primary display screen 110 and the secondary display screen 120 to a certain degree, and optimizing display effect.

Optionally, the transflective mirror 140 includes a first side edge 1401 and a second side edge 1402 that are opposite to each other. The first side edge 1401 is attached to a side edge of the secondary display screen 120 facing the primary display region 11. A projection of the second side edge 1402 in a second direction coincides with a back surface of the primary display screen 110. The second direction is a direction of the secondary display region 12 facing the primary display region 11. A vertical projection of the second side edge on a plane where the secondary display screen 120 is located coincides with a side edge of the secondary display region 12 facing away from the primary display region 11.

Figure 3:
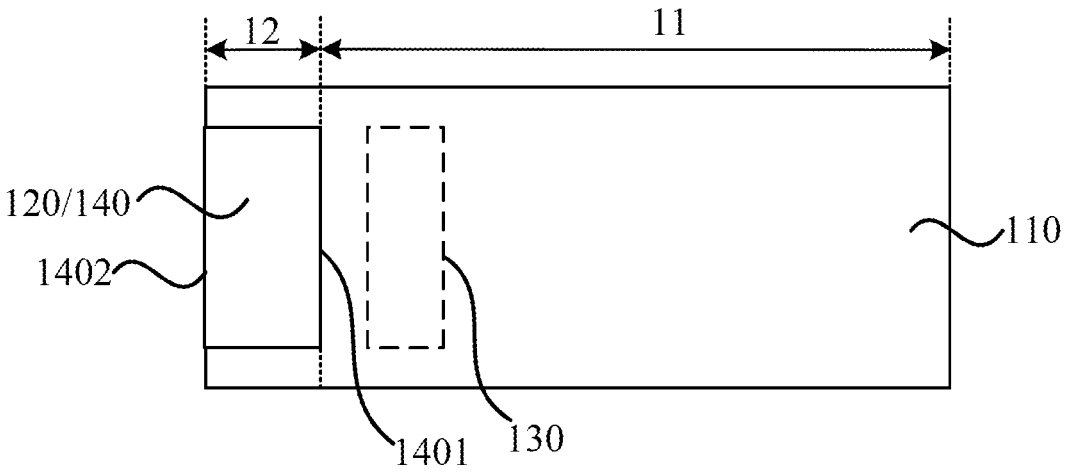
FIG. 3 is a top view of a display device according to an embodiment of the present disclosure.

Specifically, FIG. 3 is a top view of a display device according to an embodiment of the present disclosure. As shown in FIGS. 2 and 3, the transflective mirror 140 includes the first side edge 1401 and the second side edge 1402 that are opposite to each other, the first side edge 1401 is attached to the side edge of the secondary display screen 120 facing the primary display region 11, and the transflective mirror 140 is inclined from the first direction to the primary display screen 110 with the first side edge 1401 as an axis. The projection of the second side edge 1402 in the second direction coincides with the back surface of the primary display screen 110. The vertical projection of the second side edge 1402 on the plane where the secondary display screen 120 is located coincides with the side edge of the secondary display region 12 facing away from the primary display region 11. Such a structure enables the transflective mirror 140 to reflect all the external incident light in the gap between the primary display screen 110 and the secondary display screen 120 in the first direction. The external incident light is completely reflected and the external reflected light is formed on the first reflective surface 141 of the transflective mirror 140, preventing the external incident light from not being completely reflected by the first reflective surface 141 of the transflective mirror 140.

Optionally, an included angle $\theta$ between at least a partial region of the first reflective surface 141 and the plane where the secondary display screen 120 is located satisfies that $\theta<45°$.

Specifically, compared with FIG. 1, in the case where the included angle $\theta$ between at least a partial region of the first reflective surface 141 and the plane where the secondary display screen 120 is located satisfies that $\theta=45°$, when the external incident light is vertically incident, the external incident light is reflected through the first reflective surface 141 of the transflective mirror 140. In this case, the external reflected light is reflected toward the gap between the primary display screen 110 and the secondary display screen 120 and can be vertically incident to the light receiving surface of the image acquisition unit 130. If the included angle $\theta$ between at least a partial region of the first reflective surface 141 and the plane where the secondary display screen 120 is located satisfies that $\theta>45°$, when the external incident light is vertically incident, the external incident light is reflected through the first reflective surface 141 of the transflective mirror 140. The external reflected light is reflected toward the gap between the primary display screen 110 and the secondary display screen 120. In this case, part of the light cannot be incident to the light receiving surface of the image acquisition unit 130 and may be even incident to a back-surface region of the primary display screen 110 to cause mixed optical paths, affecting the display effect of the display device. Additionally, when the included angle $\theta$ between at least a partial region of the first reflective surface 141 and the plane where the secondary display screen 120 is located satisfies that $\theta>45°$, the length L1 of the gap between the primary display screen 110 and the secondary display screen 120 in the first direction is increased to a certain degree. With continued reference to FIG. 2, when the included angle $\theta$ between at least a partial region of the first reflective surface 141 and the plane where the secondary display screen 120 is located satisfies that $\theta<45°$, the length L1 of the gap between the primary display screen 110 and the secondary display screen 120 in the first direction can be reduced, and the propagation direction of the optical path can be adjusted. Thus, the position of the image acquisition unit 130 is changed.

Optionally, the display device further includes at least one reflective mirror 150 disposed on the back surface of the primary display screen 110 and located on an optical path of the external reflected light. On the optical path of the external reflected light, the image acquisition unit 130 is located after the at least one reflective mirror 150.

Specifically, with continued reference to FIG. 2, the external incident light is vertically incident to the first reflective surface 141 of the transflective mirror 140, the external reflected light obtained through the reflection of the first reflective surface 141 is reflected toward the gap between the primary display screen 110 and the secondary display screen 120, the at least one reflective mirror 150 is disposed on the back surface of the primary display screen 110 and located on the optical path of the external reflected light, and on the optical path of the external reflected light, the image acquisition unit 130 is located after the at least one reflective mirror 150.

It is to be noted that a propagation path of the external reflected light of the transflective mirror 140 can be adjusted through the at least one reflective mirror 150, thereby changing the arrangement position of the image acquisition unit 130. In this case, the issue that the position of the image acquisition unit 130 and the orientation of the image acquisition unit 130 are restricted by the limited internal space of the display device can be solved. The at least one reflective mirror 150 can change the propagation direction of the optical path. The position of the image acquisition unit 130 on the propagation path of the external reflected light can be adjusted correspondingly by increasing the number of reflective mirrors 150 and adjusting the angle of inclination of the reflective mirror 150 appropriately so that the layout of the image acquisition unit 130 is more convenient and reasonable, avoiding the limitation, imposed by the position of the image acquisition unit 130, on the length L1 of the gap between the primary display screen 110 and the secondary display screen 120 in the first direction.

Optionally, the at least one reflective mirror 150 includes a first reflective mirror 1500. A side edge of the first reflective mirror 1500 is attached to a side edge of the primary display screen 110 facing the secondary display region 12. An included angle $\alpha$ between at least a partial region of the first reflective mirror 1500 and a plane where the primary display screen 110 is located satisfies that $0 \leq \alpha \leq \theta$.

Specifically, with continued reference to FIG. 2, the side edge of the first reflective mirror 1500 is attached to the side edge of the primary display screen 110 facing the secondary display region 12, guaranteeing that the first reflective mirror 1500 can reflect all the external reflected light to the image acquisition unit 130. The first reflective mirror 1500 is inclined from the primary display screen 110 toward a direction opposite to the first direction so that the reflected light reflected by the first reflective mirror 1500 faces the image acquisition unit 130. Moreover, the included angle $\alpha$ between at least a partial region of the first reflective mirror 1500 and the plane where the primary display screen 110 is located satisfies that $0 \leq \alpha \leq \theta$, guaranteeing that the first reflective mirror 1500 can reflect all the external reflected light to the image acquisition unit 130. If the included angle $\alpha$ between at least a partial region of the first reflective mirror 1500 and the plane where the primary display screen

110 is located satisfies that $\alpha > \theta$, part of the external reflected light is reflected to a region of the secondary display screen 120 by the first reflective mirror 1500 and be blocked by the secondary display screen 120, causing mixed optical paths and affecting the display effect of the display device.

Optionally, the light receiving surface of the image acquisition unit 130 is parallel to a light emission surface of secondary display screen 120 and faces the primary display screen 110.

Figure 4:
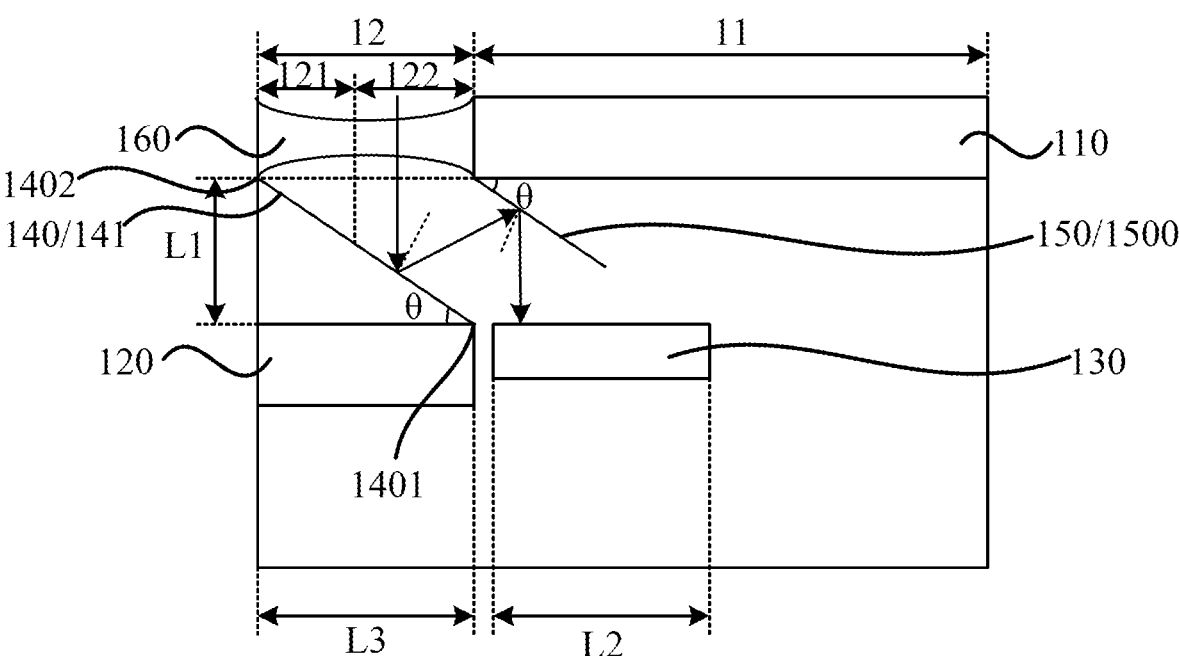
FIG. 4 is a structural diagram of another display device according to an embodiment of the present disclosure.

Specifically, FIG. 4 is a structural diagram of another display device according to an embodiment of the present disclosure. As shown in FIG. 4, the light receiving surface of the image acquisition unit 130 should be located after the at least one reflective mirror 150 and on the optical path of the reflected light. In the case where the included angle $\alpha$ between at least a partial region of the first reflective mirror 1500 and the plane where the primary display screen 110 is located satisfies that $\alpha = \theta$, when the external incident light is vertically incident, the external reflected light reflected on the first reflective surface 141 of the transflective mirror 140 satisfies the law of reflection that the angle of incidence is equal to the angle of reflection. A light beam that is vertically incident is obtained on the light receiving surface of the image acquisition unit 130. The light receiving surface of the image acquisition unit 130 is parallel to the light emission surface of the secondary display screen 120 and faces the primary display screen 110, improving the utilization rate of the image acquisition in the secondary display region 12 and alleviating the phenomenon of display unevenness caused by the gap between the primary display screen 110 and the secondary display screen 120.

Optionally, the image acquisition unit 130 is located on a side of the plane where the secondary display screen 120 is located facing away from the primary display screen 110.

Figure 5:
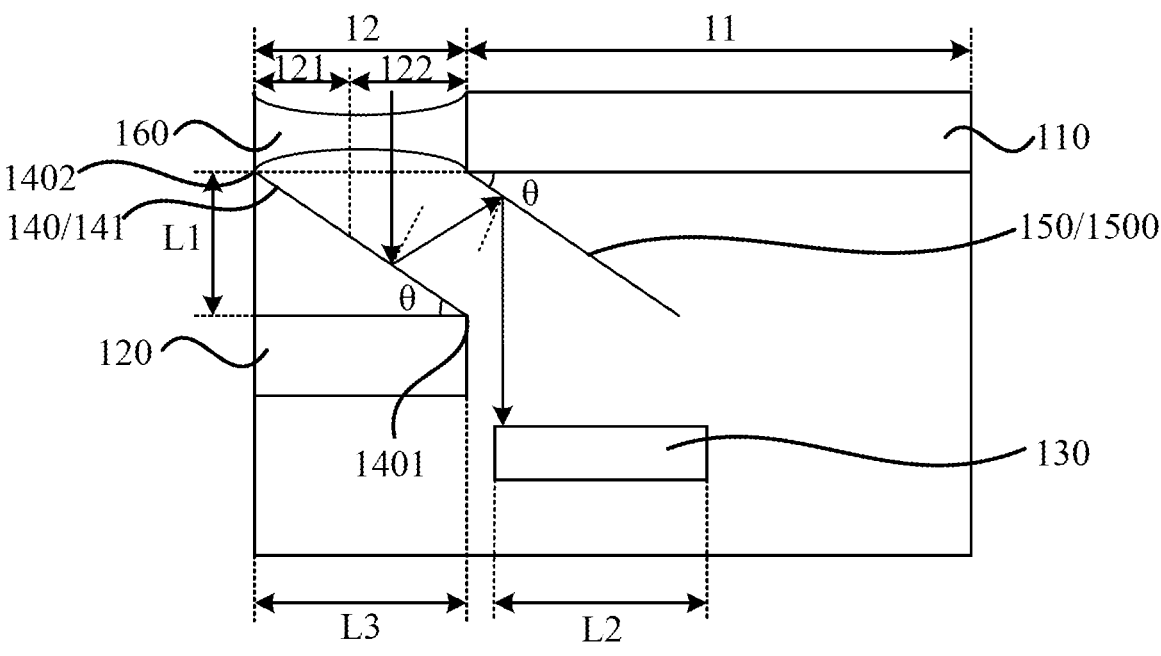
FIG. 5 is a structural diagram of another display device according to an embodiment of the present disclosure.
Figure 6:
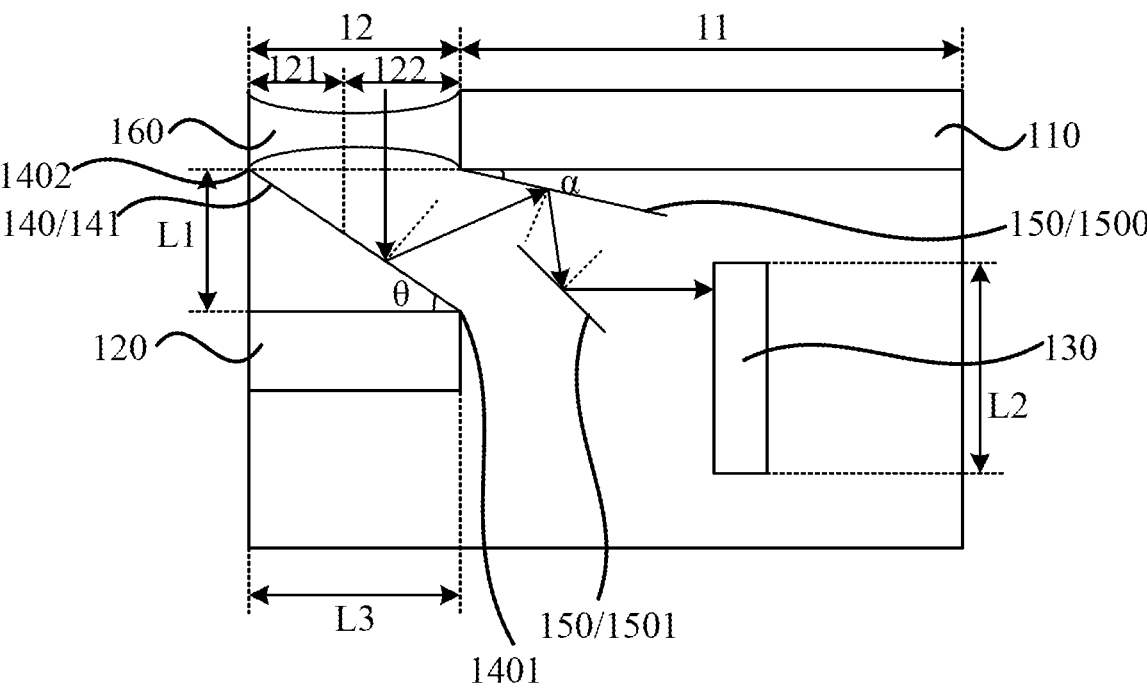
FIG. 6 is a structural diagram of another display device according to an embodiment of the present disclosure.

Specifically, FIG. 5 is a structural diagram of another display device according to an embodiment of the present disclosure. As shown in FIG. 5, the propagation path of the external reflected light of the transflective mirror 140 can be adjusted through the at least one reflective mirror 150, thereby changing the position of the image acquisition unit 130 to be changed. In this case, the problem that the position of the image acquisition unit 130 and the orientation of the image acquisition unit 130 are restricted by the limited internal space of the display device is solved. The at least one reflective mirror 150 changes the propagation direction of the optical path. The position of the image acquisition unit 130 on the propagation path of the external reflected light is adjusted correspondingly by increasing the number of reflective mirrors 150 and adjusting the angle of inclination of the reflective mirror 150 appropriately so that the layout of the image acquisition unit 130 is more convenient and reasonable, avoiding the limitation, imposed by the position of the image acquisition unit 130, on the length L1 of the gap between the primary display screen 110 and the secondary display screen 120 in the first direction. Exemplarily, FIG. 6 is a structural diagram of another display device according to an embodiment of the present disclosure. As shown in FIG. 6, a second reflective mirror 1501 is disposed on the optical path of the external reflected light to change the propagation direction of the optical path. Moreover, the position of the image acquisition unit 130 and the orientation of the image acquisition unit 130 may be different from positions and orientations shown in FIGS. 2, 4, and 5. The image acquisition unit 130 is located on a side of the plane where the secondary display screen 120 is located facing away from the primary display screen 110. The light receiving surface of the image acquisition unit 130 should be located after the at least one reflective mirror 150. The position of the image acquisition unit 130 may be inclined. The orientation of the image acquisition unit 130 may be toward a side away from the light emission surface of the secondary display screen 120.

Optionally, a vertical projection of the light receiving surface of the image acquisition unit 130 on the plane where the secondary display screen 120 is located is connected to the secondary display screen 120.

Figure 7:
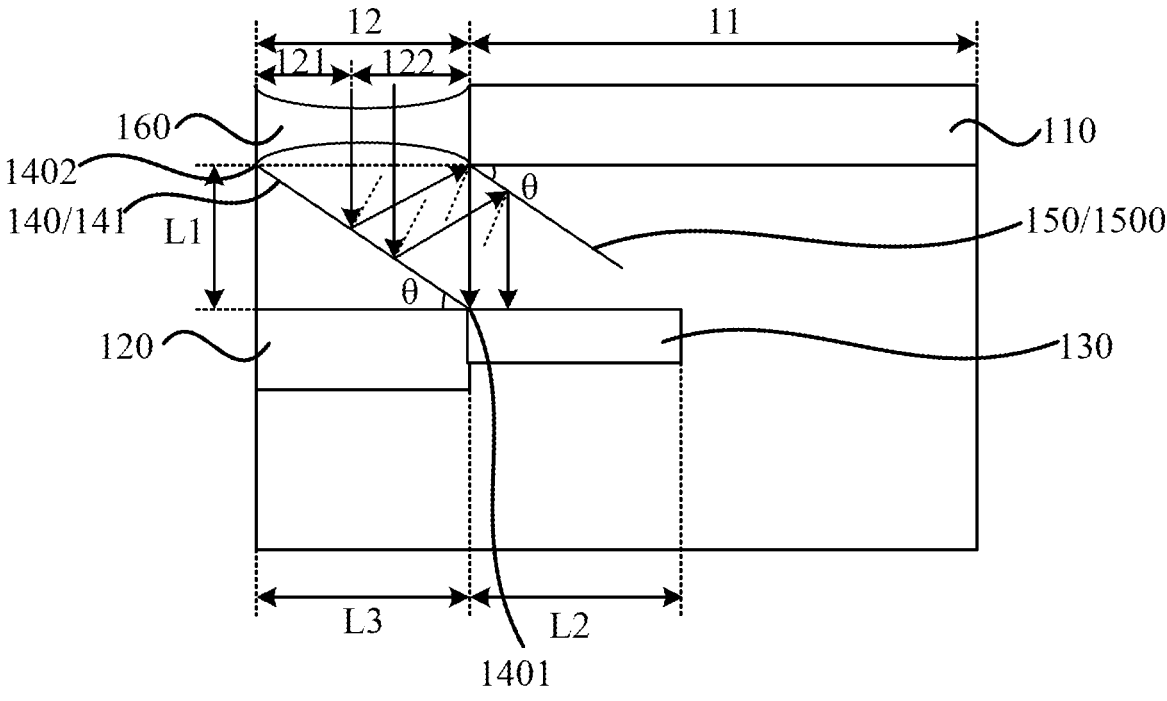
FIG. 7 is a structural diagram of another display device according to an embodiment of the present disclosure.
Figure 8:
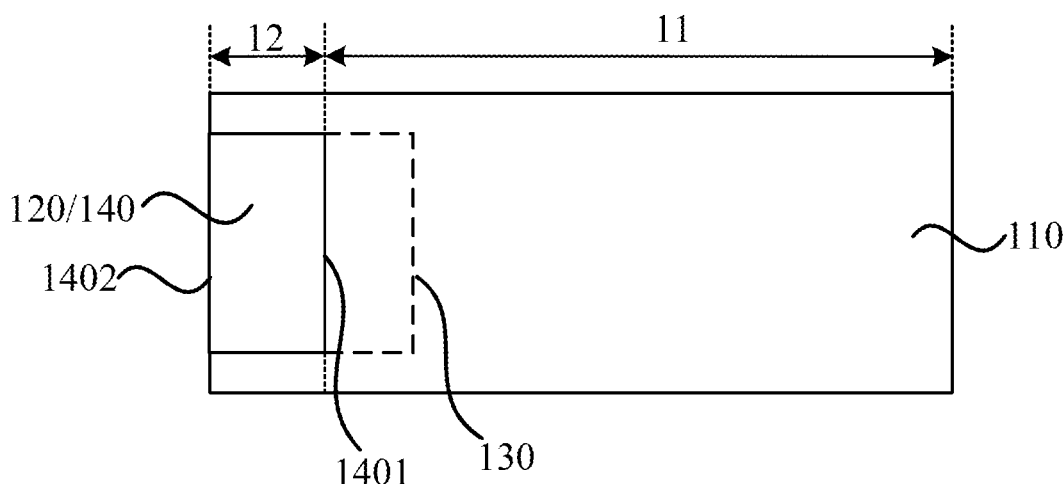
FIG. 8 is a top view of another display device according to an embodiment of the present disclosure.

Specifically, FIG. 7 is a structural diagram of another display device according to an embodiment of the present disclosure. FIG. 8 is a top view of another display device according to an embodiment of the present disclosure. As shown in FIGS. 7 and 8, the vertical projection of the light receiving surface of the image acquisition unit 130 on the plane where the secondary display screen 120 is located is connected to the secondary display screen 120, and the angle of inclination of the transflective mirror 140 and the angle of inclination of the first reflective mirror 1500 are the same and are each θ. The position of the image acquisition unit 130 is limited to guarantee that the external incident light can be completely reflected to the light receiving surface of the image acquisition unit 130. If a gap exists between the secondary display screen 120 and the vertical projection of the light receiving surface of the image acquisition unit 130 on the plane where the secondary display screen 120 is located, the light receiving surface of the image acquisition unit 130 may be incapable of receiving all the incident light of the secondary display region 12, affecting the utilization rate of the image acquisition of the secondary display region 12. Additionally, the utilization area of the light receiving surface of the image acquisition unit 130 cannot be maximized to a certain extent.

Optionally, the first reflective surface 141 is a plane. The included angle θ further satisfies that $θ≥θ_{min}$. $θ_{min}$ satisfies that $L3*\tan θ_{min}=L2*\tan θ_{min}+L2*\tan (π/2-2*θ_{min})$. L3 denotes the length of a section line segment of the secondary display screen 120 on the first plane.

Figure 9:
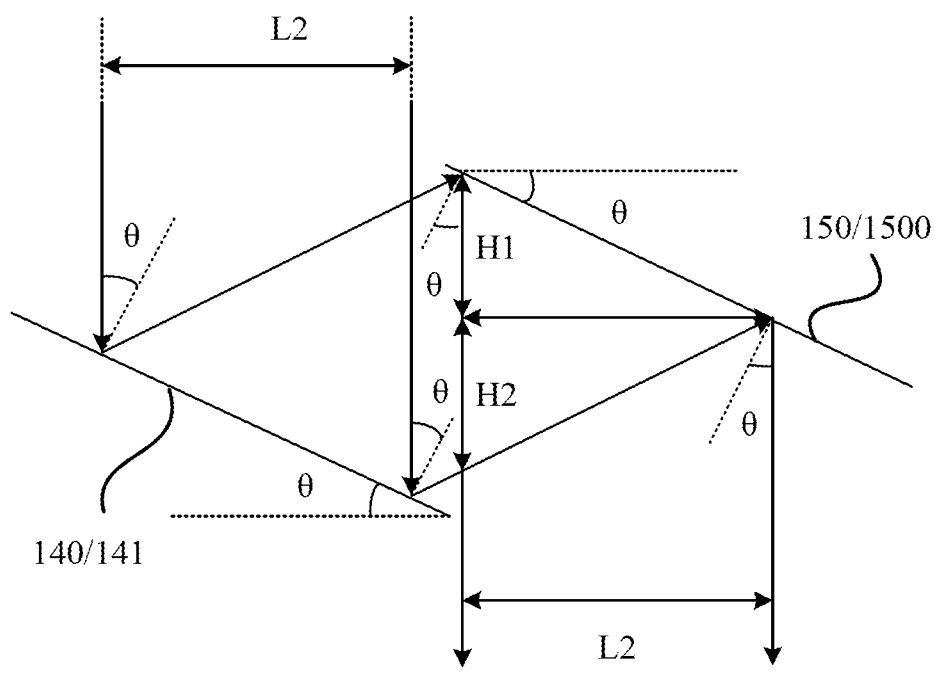
FIG. 9 is a diagram illustrating a propagation path of external incident light in a display device according to an embodiment of the present disclosure.

Specifically, FIG. 9) is a diagram illustrating a propagation path of external incident light in a display device according to an embodiment of the present disclosure. As shown in FIG. 9, when the first reflective surface 141 of the transflective mirror 140 is a plane, according to the reflection principle, the width of a reflected light beam and the width of an incident light beam are equal and are each L2. Accordingly, the width of the light beam reflected twice by the transflective mirror 140 and the first reflective mirror 1500 remains unchanged. The smaller the angle θ between at least a partial region of the first reflective surface 141 of the transflective mirror 140 and the plane where the secondary display screen 120 is located, the narrower the width of the light beam reflected by the transflective mirror 140 to the first reflective mirror 1500. The lower limit value of the width of the reflected light beam should be the length L2 of a section line segment of the light receiving surface of the image acquisition unit 130 on the first plane. The lower limit value of the angle θ between at least a partial region of the first reflective surface 141 of the transflective mirror 140 and the plane where the secondary display screen 120 is located should guarantee that the reflected light beam with a width of L2 is incident onto the first reflective mirror 1500. L3 denotes the length of the section line segment of the secondary display screen 120 on the first plane. L1 denotes the length of the gap between the primary display screen 110 and the secondary display screen 120 in the first direction. In this case, the angle of inclination of the transflective mirror 140 and the angle of inclination of the first reflective mirror 1500 are the same and are each $θ_{min}$. The angle corresponding to L1 is $θ_{min}$. Moreover. L1 and L3 satisfy a tangent relationship that $L1=L3*\tan θ_{min}$. L2 denotes the length of the section line segment of the light receiving surface of the image acquisition unit 130 on the first plane. The angle corresponding to H1 is $θ_{min}$. The angle corresponding to H2 is $π/2-2*θ_{min}$. L1=H1+H2. Moreover. L1 and L2 satisfy a tangent relationship. $H1=L2*\tan θ_{min}$. $H2=L2*\tan (π/2-2*θ_{min})$. $L1=L2*\tan θ_{min}+L2*\tan (π/2-2*θ_{min})$. $θ_{min}$ denotes the lower limit value of the angle between at least a partial region of the first reflective surface 141 of the transflective mirror 140) and the plane where the secondary display screen 120 is located.

In embodiments of the present disclosure, on the basis of pre-setting the image acquisition unit 130, the angle range of θ is limited, improving the utilization rate of the acquisition area of the light receiving surface of the image acquisition unit 130, maximizing the area of the image acquisition region, and enabling the light beam with a width of L2 to be completely incident to the light receiving surface of the image acquisition unit 130.

Optionally, the secondary display region 12 includes at least a first transflective region 121 and a second transflective region 122. The first transflective region 121 is located on a side of the second transflective region 122 facing away from the primary display region 11 in the second direction. A propagation direction of the external reflected light formed by the first reflective surface 141 in the first transflective region 121 is different from a propagation direction of the external reflected light formed by the first reflective surface 141 in the second transflective region 122.

Specifically, with continued reference to FIG. 2, the second direction is the direction of the secondary display region 12 facing the primary display region 11. The secondary display region 12 includes at least the first transflective region 121 and the second transflective region 122. The first transflective region 121 is located on a side of the second transflective region 122 facing away from the primary display region 11 in the second direction. The second transflective region 122 is a region where the external incident light that is vertically incident can be reflected onto the first reflective mirror 1500 through the transflective mirror 140. The first transflective region 121 is a region where the external incident light that is vertically incident cannot be reflected onto the first reflective mirror 1500 through the transflective mirror 140. The propagation direction of the external reflected light formed by the first reflective surface 141 in the first transflective region 121 is different from the propagation direction of the external reflected light formed by the first reflective surface 141 in the second transflective region 122. The reflected light of the first transflective region 121 and the reflected light of the second transflective region 122 may be received in regions of the light receiving surface of the image acquisition unit 130 separately. The two regions of the light receiving surface may be spliced to form a complete optical-path transmission of the external incident light in the secondary display region 12, improving the utilization rate of the image acquisition in the secondary display region 12.

Optionally, at least one prism structure 142 is disposed on the first reflective surface 141 in the first transflective region 121.

Figure 10:
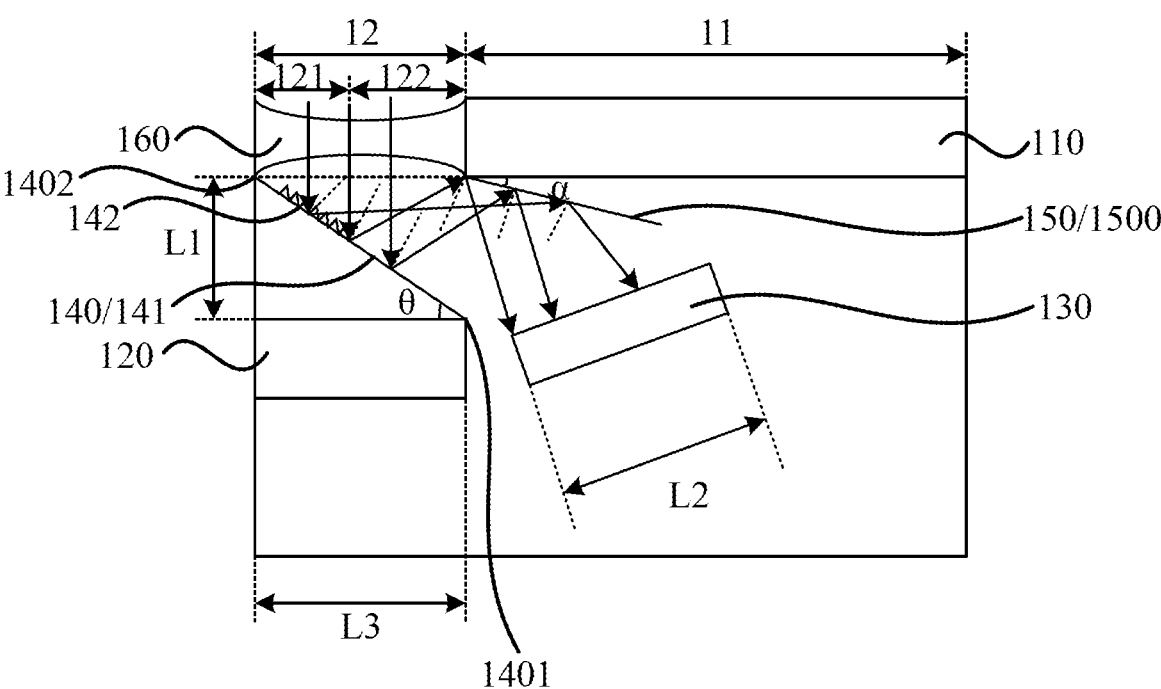
FIG. 10 is a structural diagram of another display device according to an embodiment of the present disclosure.
Figure 11:
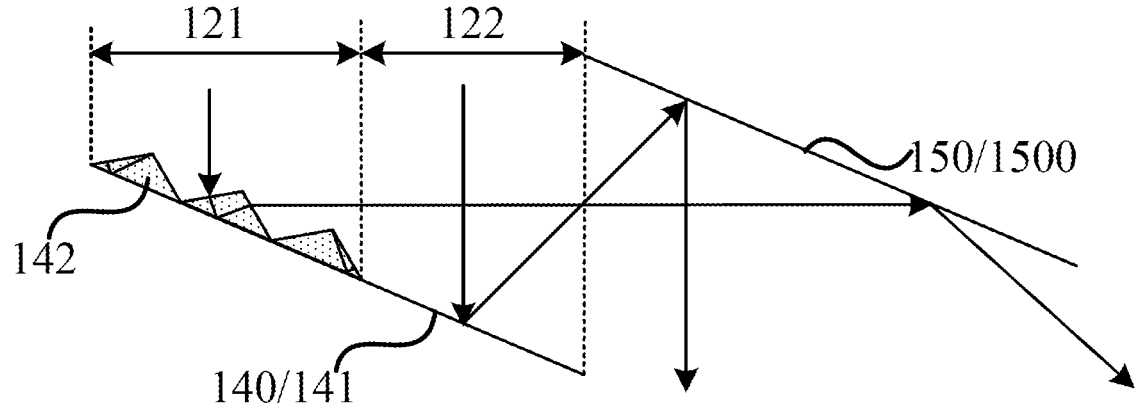
FIG. 11 is a diagram illustrating another propagation path of external incident light in a display device according to an embodiment of the present disclosure.

Specifically, FIG. 10 is a structural diagram of another display device according to an embodiment of the present disclosure. FIG. 11 is a diagram illustrating another propagation path of external incident light in a display device according to an embodiment of the present disclosure. As shown in FIGS. 10 and 11, the at least one prism structure 142 is disposed on the first reflective surface 141 of the transflective mirror 140 in the first transflective region 121. The at least one prism structure 142 may adjust the propagation direction of the external reflected light to the first reflected mirror 1500. In this case, the issue that the external incident light that is vertically incident in the first transflective region 121 cannot be propagated to the image acquisition unit 130 can be solved; moreover, the issue that the utilization rate of the image acquisition in the secondary display region 12 is relatively small can be solved. The arrangement in which the prism structure 142 is disposed in the first transflective region 121 can increase the image acquisition area of the display device and effectively utilize a window of the secondary display region 12.

It is to be noted that with a reasonable configuration of parameters such as the shape of the prism structure 142 and the index of refraction of the prism structure 142, a region in part of the prism structure 142 where the external incident light, after being reflected by the prism structure 142, cannot be incident to the first reflective mirror 1500 is reduced appropriately, and a region in part of the prism structure 142 where the external incident light, after being reflected by the at least one prism structure 142, can be incident to the first reflective mirror 1500 is increased appropriately. In this case, a propagation path of the external reflected light reflected by the prism structure 142 in the first transflective region 121 and a propagation path of the external reflected light reflected by the first reflective surface 141 in the second transflective region 122 do not overlap each other on the first reflective mirror 1500. Moreover, if the image acquisition unit 130 acquires the external reflected light reflected by the first transflective region 121 and the external reflected light reflected by the second transflective region 122 simultaneously, when the light beam width of the external reflected light reflected by the second transflective region 122 satisfies the maximum width of an acquired light beam on the light receiving surface of the image acquisition unit 130, the area of the light receiving surface of the image acquisition unit 130 may be expanded appropriately; alternatively, each of the first transflective region 121 and the second transflective region 122 is provided with a light receiving surface of a respective one of two different image acquisition units 130 so that corresponding images are separately acquired in regions of light receiving surfaces of the two different image acquisition units 130.

Optionally, an included angle between the first reflective surface 141 in the first transflective region 121 and the plane where the secondary display screen 120 is located is unequal to an included angle between the first reflective surface 141 in the second transflective region 122 and the plane where the secondary display screen 120 is located.

Figure 12:
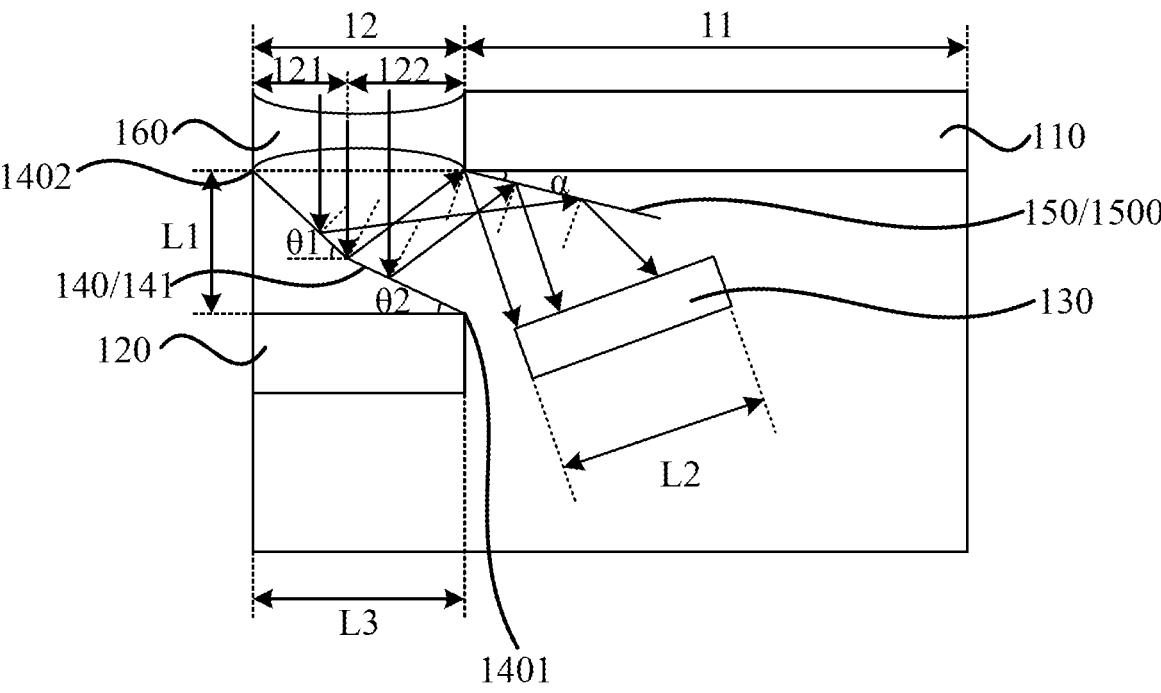
FIG. 12 is a structural diagram of another display device according to an embodiment of the present disclosure.

Specifically, FIG. 12 is a structural diagram of another display device according to an embodiment of the present disclosure. As shown in FIG. 12, when the first reflective surface 141 is a plane, the second transflective region 122 is the region where the external incident light that is vertically incident can be reflected onto the first reflective mirror 1500 through the transflective mirror 140, and the first transflective region 121 is the region where the external incident light that is vertically incident cannot be reflected onto the first reflective mirror 1500 through the transflective mirror 140. To solve the issue that the external incident light in the first transflective region 121 cannot be acquired, the included angle between the first reflective surface 141 in the first transflective region 121 and the plane where the secondary display screen 120 is located may be configured to be unequal to the included angle between the first reflective surface 141 in the second transflective region 122 and the plane where the secondary display screen 120 is located, the external incident light reflected by the first reflective surface 141 in the first transflective region 121 is adjusted to be incident to the first reflective mirror 1500, and the transflective mirror 140 is partitioned and provided with different angles of inclination so that the propagation path of the reflected light in the first transflective region 121 and the propagation path of the reflected light in the second transflective region 122 are changed, improving the utilization rate of the image acquisition of the secondary display region 12. Moreover, with a reasonable configuration of the included angle between the first reflective surface 141 in the first transflective region 121 and/or the second transflective region 122 and the plane where the secondary display screen 120 is located, the propagation path of the external reflected light reflected by the first reflective surface 141 in the first transflective region 121 and the propagation path of the external reflected light reflected by the first reflective surface 141 in the second transflective region 122 do not overlap each other on the first reflective mirror 1500. Moreover, if the image acquisition unit 130 acquires the external reflected light reflected by the first transflective region 121 and the external reflected light reflected by the second transflective region 122 simultaneously, when the light beam width of the external reflected light reflected by the second transflective region 122 satisfies the maximum width of an acquired light beam on the light receiving surface of the image acquisition unit 130, the area of the light receiving surface of the image acquisition unit 130 may be widened appropriately; alternatively, each of the first transflective region 121 and the second transflective region 122 is provided with a light receiving surface of a respective one of two different image acquisition units 130 so that corresponding images are separately acquired in regions of light receiving surfaces of the two different image acquisition units 130.

Optionally, the included angle θ1 between the first reflective surface 141 in the first transflective region 121 and the plane where the secondary display screen 120 is located and the included angle θ2 between the first reflective surface 141 in the second transflective region 122 and the plane where the secondary display screen 120 is located satisfy that θ1>θ2.

Specifically, with continued reference to FIG. 12, the included angle between the first reflective surface 141 in the first transflective region 121 and the plane where the secondary display screen 120 is located is θ1, and the included angle between the first reflective surface 141 in the second transflective region 122 and the plane where the secondary display screen 120 is located is θ2. θ1 is configured to be unequal to θ2, guaranteeing that the propagation direction of the external reflected light formed by the first reflective surface 141 in the first transflective region 121 is different from the propagation direction of the external reflected light formed by the first reflective surface 141 in the second transflective region 122. If θ1<θ2, the external incident light reflected by the first reflective surface 141 in the first transflective region 121 cannot be completely incident to the first reflective mirror 1500, causing the utilization rate of the image acquisition in the first transflective region 121 to be relatively low; When θ1>θ2, the external incident light reflected by the first reflective surface 141 in the first transflective region 121 can be completely incident to the first reflective mirror 1500. In this case, the issue that the external incident light in the first transflective region 121 cannot be acquired is solved, improving the utilization rate of the image acquisition in the first transflective region 121.

Optionally, the first reflective mirror 1500 includes at least a first reflective region 151 and a second reflective region 152. The first reflective mirror 1500 in the first reflective region 151 is parallel to the transflective mirror 140 in the first transflective region 121. The second reflective mirror 1501 in the second reflective region 152 is parallel to the transflective mirror 140 in the second transflective region 122.

Figure 13:
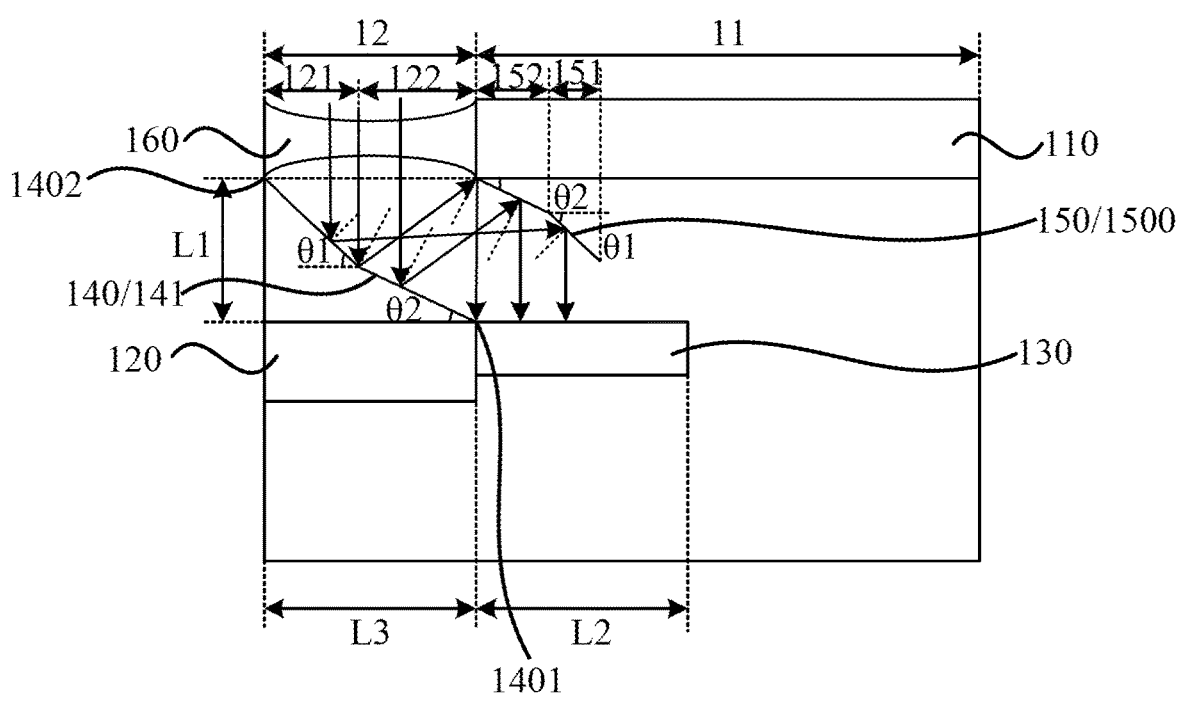
FIG. 13 is a structural diagram of another display device according to an embodiment of the present disclosure.

Specifically. FIG. 13 is a structural diagram of another display device according to an embodiment of the present disclosure. As shown in FIG. 13, the secondary display region 12 includes the first transflective region 121 and the second transflective region 122. The first transflective region 121 is located on a side of the second transflective region 122 facing away from the primary display region 11 in the second direction. The second direction is the direction of the secondary display region 12 facing the primary display region 11. The propagation direction of the external reflected light formed by the first reflective surface 141 in the first transflective region 121 is different from the propagation direction of the external reflected light formed by the first reflective surface 141 in the second transflective region 122. The first reflective mirror 1500 includes the first reflective region 151 and the second reflective region 152. The first reflective mirror 1500 in the first reflective region 151 and the transflective mirror 140 in the first transflective region 121 are parallel to each other and have the same angle θ1 of inclination. The second reflective mirror 1501 in the second reflective region 152 and the transflective mirror 140 in the second transflective region 122 are parallel to each other and have the same angle θ2 of inclination. When the first reflective mirror 1500 in the first reflective region 151 and the transflective mirror 140 in the first transflective region 121 have the same angle of inclination and when the external incident light is vertically incident, according to the reflection principle, the external reflected light reflected by the first reflective region 151 can be vertically incident to the light receiving surface of the image acquisition unit 130. Similarly, when the second reflective mirror 1501 in the second reflective region 152 and the transflective mirror 140 in the first transflective region 122 have the same angle of inclination and when the external incident light is vertically incident, according to the reflection principle, the external reflected light reflected by the second reflective region 152 can be vertically incident to the light receiving surface of the image acquisition unit 130. Moreover, the propagation path of a light beam in the first transflective region 121 and the propagation path of a light beam in the second transflective region 122 do not overlap each other, and correspondingly, the propagation path of a light beam in the first reflective region 151 and the propagation path of a light beam in the second reflective region 152 do not overlap each other, expanding the area of the light receiving surface of the image acquisition unit 130 appropriately: increasing the image acquisition area, and improving the utilization rate of image acquisition.

Optionally, a plurality of transflective sub-mirrors 143 is disposed on the first reflective surface 141 in the first transflective region 121. An included angle θ1' between a plane where each transflective sub-mirror 143 is located and the plane where the secondary display screen 120 is located and an included angle θ2 between the first reflective surface 141 in the second transflective region 122 and the plane where the secondary display screen 120 is located satisfy that θ1'>θ2.

Figure 14:
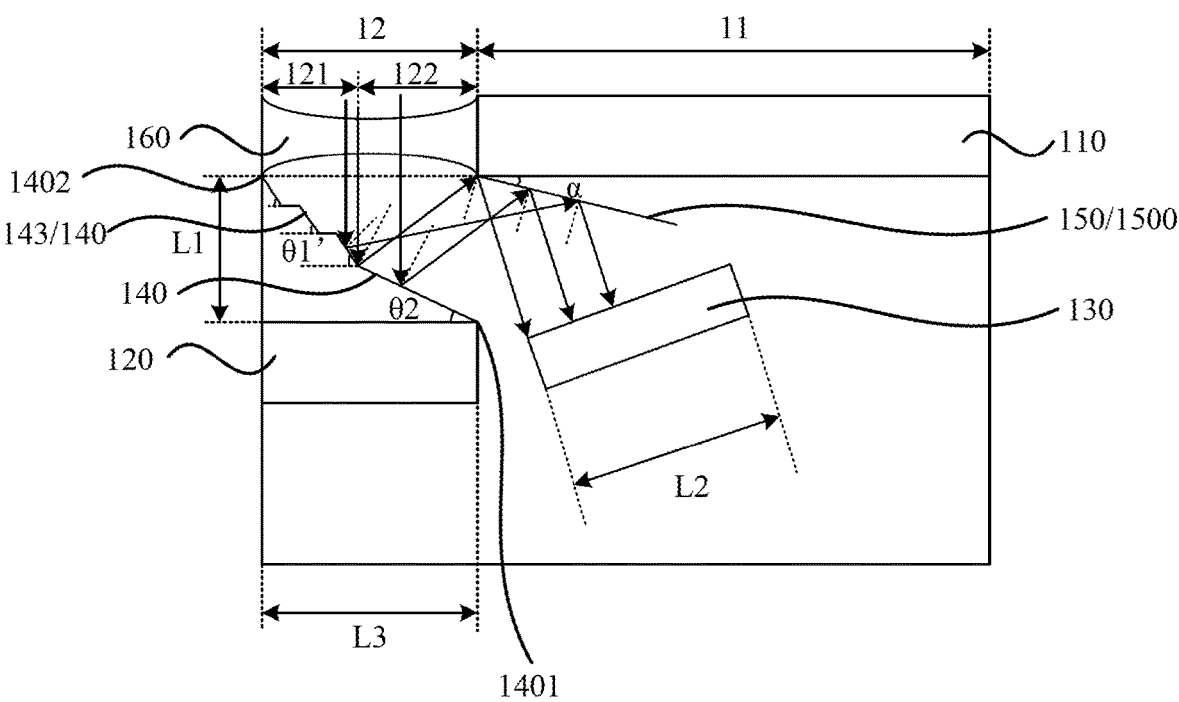
FIG. 14 is a structural diagram of another display device according to an embodiment of the present disclosure.

Specifically. FIG. 14 is a structural diagram of another display device according to an embodiment of the present disclosure. As shown in FIG. 14, the plurality of transflective sub-mirrors 143 is disposed on the first reflective surface 141 in the first transflective region 121, and the included angle between the plane where each transflective sub-mirror 143 is located and the plane where the secondary display screen 120 is located is the same and is θ1'. The relationship between θ1' and θ2 is that θ1'>θ2. When θ1'>θ2, the external incident light reflected by the first reflective surface 141 in the first transflective region 121 can be completely incident to the first reflective mirror 1500. In this case, the issue that the external incident light in the first transflective region 121 cannot be acquired is solved, and the utilization rate of the image acquisition in the first transflective region 121 is improved. The transflective sub-mirrors 143 are disposed on the first reflective surface 141 in the first transflective region 121 so that each included angle between each plane where each transflective sub-mirror 143 is located and the plane where the secondary display screen 120 is located can be configured accurately, thereby adjusting the propagation path of the external reflected light incident to the first reflective mirror 1500, guaranteeing no overlap in the transmission process of the reflected light, and finally enabling the external incident light to be completely incident to the light receiving surface of the image acquisition unit 130.

Optionally, the transflective mirror 140 is a negative cylindrical mirror. An axial meridian 144 of the transflective mirror 140 is parallel to a plane where the secondary display region 12 is located. An included angle θ between a chord surface 145 of the transflective mirror 140 and the plane where the secondary display screen 120 is located satisfies that θ<45°. Further, the first reflective mirror 1500 is a negative cylindrical mirror. An axial meridian 146 of the first reflective mirror 1500 is parallel to the plane where the secondary display region 12 is located. A chord surface 147 of the first reflective mirror 1500 is parallel to the chord surface 145 of the transflective mirror 140.

Figure 15:
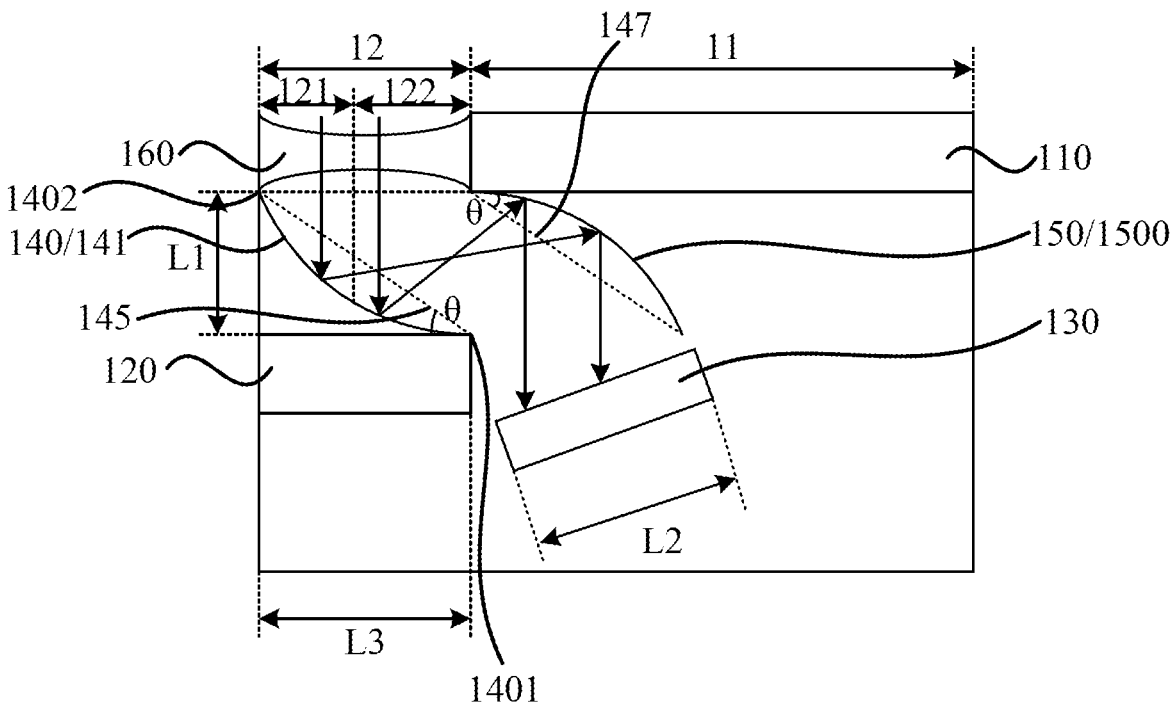
FIG. 15 is a structural diagram of another display device according to an embodiment of the present disclosure.
Figure 16:
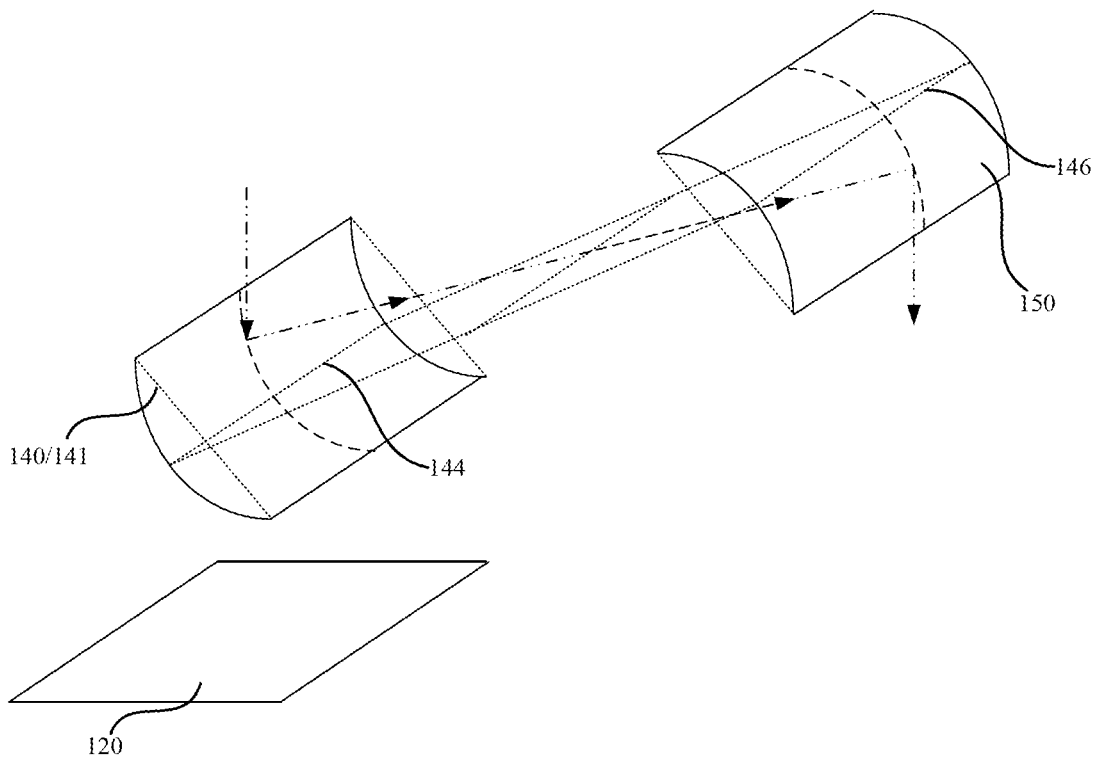
FIG. 16 is a diagram illustrating another propagation path of external incident light in a display device according to an embodiment of the present disclosure.

Specifically, FIG. 15 is a structural diagram of another display device according to an embodiment of the present disclosure. FIG. 16 is a diagram illustrating another propagation path of external incident light in a display device according to an embodiment of the present disclosure. As shown in FIGS. 15 and 16, the transflective mirror 140 and the first reflective mirror 1500 may be each configured as a negative cylindrical mirror. The axial meridian 144 of the transflective mirror 140 and the axial meridian 146 of the first reflective mirror 1500 are each parallel to the plane where the secondary display region 12 is located. The included angle between the chord surface 145 of the transflective mirror 140 and the plane where the secondary display screen 120 is located is the same as an included angle between the chord surface 147 of the first reflective mirror 1500 and the plane where the secondary display screen 120 is located, and the two included angles are each θ which satisfies that θ<45°. In this case, the length L1 of the gap between the primary display screen 110 and the secondary display screen 120 in the first direction can be reduced, and the propagation direction of the optical path can be adjusted. Thus, the position of the image acquisition unit 130 is changed.

Optionally, the first reflective mirror 1500 and the transflective mirror 140 satisfy the following condition: R1=R2=D. R1 denotes the focal length of the transflective mirror 140. R2 denotes the focal length of the first reflective mirror 1500. D denotes the distance between the center point of the first reflective mirror 1500 and the center point of the transflective mirror 140.

Specifically, with continued reference to FIGS. 15 and 16, it is guaranteed that the focal length R1 of the transflective mirror 140 and the focal length R2 of the first reflective mirror 1500 are equal to each other and are each equal to the distance between the center point of the first reflective mirror 1500 and the center point of the transflective mirror 140. The arrangement of a confocal cavity structure enables the external reflected light vertically incident to the transflective mirror 140 to be vertically incident to the light receiving surface of the image acquisition unit 130, guarantees no overlap between optical paths of rays of the reflected light, improves the utilization rate of the image acquisition of the secondary display region 12, and alleviates the phenomenon of display unevenness caused by the gap between the primary display screen 110 and the secondary display screen 120.

Optionally, rays of the reflected light formed by the external reflected light on the first reflective mirror 1500 are parallel to each other. Further, projections of the external reflected light on the first reflective mirror 1500 do not overlap each other.

Specifically, with continued reference to FIG. 2, the external reflected light is the reflected light of the external incident light on the first reflective surface 141 of the transflective mirror 140. Through an adjustment to parameters such as the angle of inclination of the transflective mirror 140, the rays of the reflected light formed by the external reflected light on the first reflective mirror 1500 are parallel to each other. The projections of the external reflected light on the first reflective mirror 1500 do not overlap each other. Accordingly, it is guaranteed that the rays of the reflected light reflected to the light receiving surface of the image acquisition unit 130 are parallel to each other and do not overlap each other, improving the utilization rate of the image acquisition of the secondary display region 12 and avoiding the issue of interfering with the image acquisition effect of the display device due to an overlap between the rays of the reflected light.

Optionally, the projections of the external reflected light on the first reflective mirror 1500 are consecutive. The length of the section line segment of the light receiving surface of the image acquisition unit 130 on the first plane is equal to the length of the section line segment of the secondary display screen 120 on the first plane.

Specifically, with continued reference to FIG. 2, through an adjustment to parameters such as the angle of inclination of the transflective mirror 140 and/or the angle of inclination of the at least one reflective mirror 150, the rays of the reflected light formed by the external reflected light on the first reflective mirror 1500 are parallel to each other. The projections of the external reflected light on the first reflective mirror 1500 do not overlap each other and are consecutive. The external reflected light that is vertically incident is incident to the first reflective surface 141 of the transflective mirror 140, is propagated through the optical path, and is finally incident to the light receiving surface of the image acquisition unit 130. The light receiving surface of the image acquisition unit 130 can acquire all light beams reflected by the transflective mirror 140. It is to be noted that the first plane is perpendicular to the secondary display screen 120. The length of the section line segment of the light receiving surface of the image acquisition unit 130 on the first plane is L2. That is, a limit value of the width of a light beam that can be received by the light receiving surface of the image acquisition unit 130 is L2. The length of the section line segment of the secondary display screen 120 on the first plane is L3. That is, a limit value of the width of a light beam that can be received by the secondary display region 12 is L3. It should be adjusted that L2=L3. That is, the length of the section line segment of the light receiving surface of the image acquisition unit 130 on the first plane is equal to the length of the section line segment of the secondary display screen 120 on the first plane, guaranteeing the maximum utilization rate of the image acquisition of the secondary display region 12 and guaranteeing the maximum utilization area of the image acquisition of the light receiving surface of the image acquisition unit 130.

Optionally, the display device further includes a magnifier 160 located in the secondary display region 12 and on the light emission side of the secondary display screen 120. The magnifier 160 and the primary display screen 110 are located in the same plane.

Specifically, with continued reference to FIG. 2, the magnifier 160 is disposed on the light emission side of the secondary display screen 120 so as to magnify the secondary display screen 120, reducing the distance between the primary display screen 110 and the secondary display screen 120 in visual perception and mitigating the display unevenness caused by the gap between the primary display screen 110 and the secondary display screen 120. Exemplarily, the magnifier 160 may be a convex lens or a concave lens.

Optionally, the image acquisition unit 130 includes a fingerprint sensor or a camera.

Specifically, with continued reference to FIG. 2, the display device is applicable to display equipment such as a mobile phone, a tablet, wearable display equipment, and vehicle-mounted display equipment. An application scenario of the display device includes a camera function and a fingerprint recognition function. When the camera function of the display device is applied, the image acquisition unit 130 may be a camera correspondingly: When the fingerprint recognition function of the display device is applied, the image acquisition unit 130 may be a fingerprint sensor correspondingly.

Optionally, the image acquisition unit 130 is a fingerprint sensor. In a fingerprint recognition stage, the secondary display screen 120 also serves as a fingerprint recognition light source.

Figure 17:
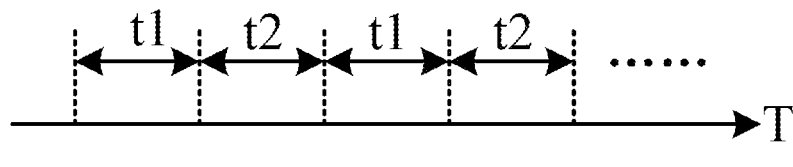
FIG. 17 is a timing diagram illustrating that a secondary display screen implements stages alternately and periodically according to an embodiment of the present disclosure.

Specifically, when the image acquisition unit 130 is the fingerprint sensor, a fingerprint recognition light source needs to be added to perform fingerprint recognition in the fingerprint recognition stage. Due to the limited internal space of the display device, if an external fingerprint recognition light source is used for emitting a fingerprint recognition light beam, the path of a light beam reflected by the transflective mirror 140 to the first reflective mirror 1500 and then reflected to the image acquisition unit 130 may be blocked in the display device, resulting in that an image acquired by the image acquisition unit 130 is inaccurate, affecting the normal operation of the camera function and the fingerprint recognition function, and even failing to add a fingerprint recognition light source due to the limited internal space of the display device. Preferably, FIG. 17 is a timing diagram illustrating that a secondary display screen implements stages alternately and periodically according to an embodiment of the present disclosure. As shown in FIG. 17, the secondary display screen 120 may be taken as the fingerprint recognition light source in the fingerprint recognition stage t1 to emit a recognition light beam in the fingerprint recognition stage t1, effectively solving the issue of the limited internal space of the display device, saving a fingerprint recognition light source assembly, and simplifying the internal structure layout of the display device. Moreover, the secondary display screen 120 may implement fingerprint recognition stages t1 and display stages t2 alternately and periodically. The secondary display screen 120 emits a recognition light beam in a fingerprint recognition stage t1 and emits a display light beam in a display stage 12, guaranteeing the effect of display and fingerprint recognition. Additionally, when a finger is detected by the fingerprint recognition sensor, the fingerprint recognition function may be performed immediately.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations and substitutions can be made without departing from the scope of the present disclosure. Therefore, while the present disclosure is described in detail through the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A display device for imaging and displaying, comprising:

a primary display screen, a secondary display screen, an image acquisition unit, a primary display region, and a secondary display region, wherein the primary display screen is used for main displaying, and the secondary display screen is used for imaging and auxiliary displaying;

the primary display region is connected to the secondary display region;

the primary display screen is disposed in the primary display region, the secondary display screen is disposed in the secondary display region, and in a first display state, a gap exists between the primary display screen and the secondary display screen in a first direction, wherein the first direction is a light emission direction of the secondary display screen, and the first direction is perpendicular to a front surface of the primary display screen;

a width of a light receiving surface of the image acquisition unit is L2; and a length L1 of the gap between the primary display screen and the secondary display screen in the first direction satisfies that L1<L2.

2. The display device according to claim 1, further comprising:

a transflective mirror located in the secondary display region and on a light emission side of the secondary display screen, wherein the transflective mirror comprises a first reflective surface facing away from the secondary display screen, and an orientation of the first reflective surface is inclined from the first direction toward the primary display screen so that external reflected light is at least reflected toward the gap between the primary display screen and the secondary display screen, wherein the external reflected light is reflected light of external incident light on the first reflective surface.

3. The display device according to claim 2, wherein the transflective mirror comprises a first side edge and a second side edge that are opposite to each other;

the first side edge is attached to a side edge of the secondary display screen facing the primary display region;

a projection of the second side edge in a second direction coincides with a back surface of the primary display screen, and the second direction is a direction of the secondary display region facing the primary display region; and a vertical projection of the second side edge on a plane where the secondary display screen is located coincides with a side edge of the secondary display region facing away from the primary display region.

4. The display device according to claim 2, wherein an included angle θ between at least a partial region of the first reflective surface and a plane where the secondary display screen is located satisfies that θ<45°.

5. The display device according to claim 4, further comprising:

at least one reflective mirror disposed on a back surface of the primary display screen and located on an optical path of the external reflected light, wherein on the optical path of the external reflected light, the image acquisition unit is located after the at least one reflective mirror;

the at least one reflective mirror comprises a first reflective mirror, and a side edge of the first reflective mirror is attached to a side edge of the primary display screen facing the secondary display region; and an included angle α between at least a partial region of the first reflective mirror and a plane where the primary display screen is located satisfies that 0≤α≤θ.

6. The display device according to claim 1, wherein the light receiving surface of the image acquisition unit is parallel to a light emission surface of the secondary display screen and faces the primary display screen.

7. The display device according to claim 6, wherein the image acquisition unit is located on a side of a plane where the secondary display screen is located facing away from the primary display screen.

8. The display device according to claim 6, wherein a vertical projection of the light receiving surface of the image acquisition unit on a plane where the secondary display screen is located is connected to the secondary display screen.

9. The display device according to claim 4, wherein the first reflective surface is a plane, and the included angle θ further satisfies that $θ≥θ_{min}$, wherein $θ_{min}$ satisfies that $L3*\tan θ_{min}=L2*\tan θ_{min}+L2*\tan (π/2−2*θ_{min})$, and L3 denotes a width of the secondary display screen.

10. The display device according to claim 3, wherein the secondary display region comprises at least a first transflective region and a second transflective region, and the first transflective region is located on a side of the second transflective region facing away from the primary display region in the second direction; and a propagation direction of external reflected light formed by the first reflective surface in the first transflective region is different from a propagation direction of external reflected light formed by the first reflective surface in the second transflective region.

11. The display device according to claim 10, wherein at least one prism structure is disposed on the first reflective surface in the first transflective region.

12. The display device according to claim 10, wherein an included angle between the first reflective surface in the first transflective region and the plane where the secondary display screen is located is unequal to an included angle between the first reflective surface in the second transflective region and the plane where the secondary display screen is located.

13. The display device according to claim 12, wherein the included angle between the first reflective surface in the first transflective region and the plane where the secondary display screen is located is $\theta 1$, and the included angle between the first reflective surface in the second transflective region and the plane where the secondary display screen is located is $\theta 2$, and $\theta 1$ and $\theta 2$ satisfy that $\theta 1 > \theta 2$.

14. The display device according to claim 12, wherein a first reflective mirror comprises at least a first reflective region and a second reflective region, the first reflective mirror in the first reflective region is parallel to the transflective mirror in the first transflective region, and a second reflective mirror in the second reflective region is parallel to the transflective mirror in the second transflective region.

15. The display device according to claim 10, wherein a plurality of transflective sub-mirrors is disposed on the first reflective surface in the first transflective region, and an included angle $\theta 1'$ between a plane where each of the plurality of transflective sub-mirrors is located and the plane where the secondary display screen is located and an included angle $\theta 2$ between the first reflective surface in the second transflective region and the plane where the secondary display screen is located satisfy that $\theta 1' > \theta 2$.

16. The display device according to claim 3, wherein the transflective mirror is a negative cylindrical mirror, an axial meridian of the transflective mirror is parallel to a plane where the secondary display region is located, and an included angle $\theta$ between a chord surface of the transflective mirror and the plane where the secondary display screen is located satisfies that $\theta < 45°$;

wherein a first reflective mirror is a negative cylindrical mirror, an axial meridian of the first reflective mirror is parallel to the plane where the secondary display region is located, and a chord surface of the first reflective mirror is parallel to the chord surface of the transflective mirror; and wherein the first reflective mirror and the transflective mirror satisfy a following condition: $R1 = R2 = D$, wherein $R1$ denotes a focal length of the transflective mirror, $R2$ denotes a focal length of the first reflective mirror, and $D$ denotes a distance between a center point of the first reflective mirror and a center point of the transflective mirror.

17. The display device according to claim 11, wherein rays of reflected light formed by the external reflected light on a first reflective mirror are parallel to each other.

18. The display device according to claim 17, wherein projections of the external reflected light on the first reflective mirror are consecutive; and the width of the light receiving surface of the image acquisition unit is equal to a width of the secondary display screen.

19. The display device according to claim 1, further comprising:

a magnifier located in the secondary display region and on a light emission side of the secondary display screen, wherein the magnifier and the primary display screen are located in a same plane.

20. The display device according to claim 1, wherein the front surface of the primary display screen is parallel to a light emission surface of the secondary display screen.

* * * * *